2,897,074
Patented July 28, 1959

2,897,074

MANUFACTURE OF ABRASIVE ARTICLES

Cyril Aubrey Redfarn, London, England

No Drawing. Application July 18, 1955
Serial No. 522,837

Claims priority, application Great Britain July 19, 1954

8 Claims. (Cl. 51—298)

This invention is for improvements in or relating to the manufacture of abrasive articles and is of particular interest in connection with the manufacture of grinding wheels.

In the conventional production of grinding wheels abrasive grains consisting, for example, of diamond dust, Carborundum, boron carbide, spinel, are bonded together with a phenol formaldehyde resin.

The phenolic resin may be in the form of a liquid resole or a "novolak" reduced 200 mesh and mixed with 8–10% of hexamethylenetetramine also reduced to 200 mesh.

When the liquid resole is used the abrasive grains are mixed with about 10% of their weight of resin and then given a heat treatment at about 90° C. in order to thicken the mixture.

A wheel is then pressed in a mould at room temperature at a pressure of 1 ton per square inch in a hydraulic press. After ejection the formed wheel is cured by open baking for about 5 hours at a temperature rising gently from 90° C. to 150° C.

When the dry powder resin is used, that is the "novolak-hexa" powder of 200 mesh, the abrasive grains are just wetted with about 3–4% of their weight of furfural and then 10% of their weight of the 200 mesh resin powder is mixed in. The mix is then pressed to a wheel in a mould at room temperature at 1 ton per square inch in a hydraulic press. After ejection the formed wheel is cured by open baking by heating at 90° C. for 24 hours followed by heating for another 24 hours at a temperature rising gently to 175° C.

Drawbacks of grinding wheels of this nature are (1) that owing to the frictional heat produced when the wheel is used, the phenolic resin bond is broken down and the abrasive particles loosened and lost; (2) that owing to the rigid nature of the resin bond, the resistance to breakdown by grinding, especially at elevated temperature, is poor.

Phenol-formaldehyde resins are known to decompose at temperatures of 175° C. and above and consequently abrasive articles, particularly grinding wheels in use if they develop surface temperatures of 175° C. or more, suffer from breakdown of the surface, leading either to glazing and consequent loss of abrasive power, or to actual wearing away and loss of the abrasive surface.

In my co-pending application Ser. No. 504,680, filed April 28, 1955, there is described a new class of phenolic resin which is a polybasic inorganic acid partial ester of a polyhydroxy aromatic compound, having an unsubstituted position reactive with formaldehyde, formed by heating said polyhydroxy aromatic compound with boric acid, a phosphoric acid or a poly-functional chlorine derivative thereof which are at least di-functional or phosphorus trichloride in such proportions and under such conditions that a substantial proportion of the phenolic hydroxy groups remain unreacted.

The phosphoric acids used in the process of this invention are preferably the wholly inorganic acids such as the ortho-, meta- and polyphosphoric acids including the cyclic meta-phosphoric acids and the poly-functional chlorine derivatives thereof include phosphorus pentachloride and phosphorus oxychloride.

The compounds produced by the process above set forth, when using the wholly inorganic phosphoric acids, are thermosettable compounds capable of being cured or cross-linked by further reaction through the phenolic hydroxy groups or by reaction with an aldehyde, for example, formaldehyde or a polymer thereof or compounds decomposable by the action of heat to yield an aldehyde, for example, hexamethylenetetramine and trishydroxymethyl phosphine oxide, with the aromatic nucleus activated by the hydroxy substituents thereon as with conventional phenolic resins.

The compounds produced when using substituted phosphonic acids which are di-functional are thermosettable only when incompletely reacted with dihydroxy aromatic compounds so as to leave a substantial number of unreacted phenolic hydroxy groups or where those di-functional acids are reacted with aromatic hydroxy compounds containing three hydroxy groups so as to produce the characteristic 3:2 functionality which is the minimal necessary for thermosettability; where, however, the reaction products of the di-functional acids contain free phenolic hydroxy groups, the compounds will react with an aldehyde because of the activation of the aromatic nuclei by the hydroxy substituents thereon as discussed in the preceding paragraph.

In said co-pending application it is further disclosed that it is possible to modify the phenolic resins so as to effect an internal plasticisation and thereby produce products having a greater degree of flexibility and this is effected by including a monohydroxy aromatic compound in the reaction mixture. For a full understanding of the nature and production of this new class of phenolic resin reference should be made to said co-pending application.

I have discovered that, due to the presence in the said phenolic resins of an appreciable proportion of inorganic material, the said resins are far more thermo-stable than are the normal phenol-formaldehyde-type resins and abrasive articles made with the use of these new phenolic resins avoid the disadvantage of decomposition at low temperatures of the order of 200° C. and, in fact, are stable at temperatures of 300° C. and over.

According to the present invention, therefore, there is provided an abrasive article comprising abrasive grains bonded with a phenolic resin which is a polybasic inorganic acid partial ester of a polyhydroxy aromatic compound produced as above set forth.

In the manufacture of grinding wheels it is preferred to incorporate some 10–15% by weight of the abrasive grains of the said phenolic resin to act as a bond, whereafter the bond is cured by the action of heat in a mould under pressure in the presence of an aldehyde such as formaldehyde, or a formaldehyde donor, or other curing agents known in the art for the curing of conventional phenolic resins.

The following examples illustrate the manner in which the invention may be carried into effect.

Example 1

A resin binder was prepared from the following ingredients:

| | Grams |
|---|---|
| Monophenyl phosphate | 12.1 |
| Resorcinol | 11 |
| Hydroquinone | 11 |
| Boric acid | 14.3 |

The above materials were thoroughly dry mixed together, heated under a reflux condenser arranged to permit the escape of water vapour but to condense the phenolic substances. The temperature was gradually raised to about 200° C. in 1 hour to yield a brown somewhat pliable and sticky resin.

The resin binder, together with 2% by weight of hexamethylenetetramine was then mixed with Carborundum grains of the appropriate size so as to form a mix of which the resin binder constituted some 10% by weight of the mix and it was then placed in a mould, formed into a wheel and finally cured by heating in an oven for about 1 hour at 175° C., followed by a final cure at a temperature of 200° C.

*Example 2*

A resin was prepared by heating together 11 g. of hydroquinone with 11 g. of resorcinol and 18.6 g. of boric acid to a final temperature of 280° C. under a short reflux condenser which allowed water to escape but condensed the phenolic substances.

This resin, together with about 2% by weight of hexamethylenetetramine was mixed with abrasive grains which may be of Carborundum or any other commonly used abrasive material and was formed into a grinding wheel and cured in the manner described in Example 1.

*Example 3*

A resin binder was prepared by mixing together 12.5 g. of phenol, 14.6 g. of hydroquinone, 22.9 g. of boric acid and 11 g. water. The mixture was heated under a reflux condenser, the temperature being gently raised to about 200° C. during the course of 1 hour.

This resin was mixed with 2% by weight thereof of hexamethylenetetramine and with abrasive grains and formed into a grinding wheel in the manner described in Example 1.

*Example 4*

This resin binder was made as follows:

|  | Grams |
|---|---|
| Phenol | 4.7 |
| Resorcinol | 9.6 |
| Hydroquinone | 9.6 |
| Boric acid | 18.6 |
| Water | 9.0 |

The four solid substances were thoroughly dry mixed together whereafter water was added and thereafter the reaction mixture was heated under a reflux condenser which was arranged to permit of the escape of water vapour but to condense the phenolic materials. Over the course of 1 hour the temperature of the reaction mixture was gently raised to 200° C. and the final product was a brown, pliable and sticky resin.

This resin in admixture with 4% by weight of hexamethylenetetramine and an appropriate quantity of abrasive grains was formed into a grinding wheel as described in Example 1.

*Example 5*

A resin binder was prepared from the following:

|  | Grams |
|---|---|
| Phenol | 12.5 |
| Hydroquinone | 7.3 |
| Resorcinol | 7.3 |
| Boric acid | 22.9 |
| Water | 11 |

The above ingredients were thoroughly mixed into a paste and heated under a short reflux condenser, permitting the escape of water vapour but condensing the phenolic substances. Heating was effected for 6 hours, the temperature rising gently to a final temperature of 220° C. to give a final product which was a brown resin which set hard on cooling.

This resin was admixed with hexamethylenetetramine in the proportion of 1½ parts thereof to 38½ parts of the resin and also with abrasive grains and was then formed into a grinding wheel in the manner described in Example 1.

*Example 6*

In carrying out this example, there was first prepared a resin by taking 2 mols of phosphorus oxychloride and 3 mols of hydroquinone which were mixed together at 110° C. and the temperature was thereafter raised to 140° C. for a period of 20 minutes.

The reaction mixture was refluxing and heating was continued for a further 20 minutes to reach a temperature of 170° C. at which temperature the reaction mixture was held for 25 minutes. The product was admixed with 10% by weight of hexamethylenetetramine.

The above-described resin composition was admixed with silicon carbide grains which pass a 100 mesh standard sieve but are retained on a 150 mesh standard sieve.

The mixture was made up by taking varying proportions of the above resin mix to the silicon carbide grains, the variations being in the proportions of 1:2, 1:2½, 1:3, 1:3½ and 1:4 of the resin to the abrasive grain by weight.

The five mixes were placed in a mould and were heated in the mould for 1 hour at 200° C. under a pressure of 1 ton per square inch, whereafter the mould was removed from the press and was heated in an oven for a further period of 1 hour at 200° C.

All of the moulded articles were satisfactory abrasives.

It will be appreciated that the foregoing examples are not exhaustive of the compositions falling within the scope of the present application and that any of the resins described in my copending application No. 504,680 may be employed and that the usual variations familiar to those skilled in the art of the manufacture of grinding wheels may be applied to the foregoing details set forth in the foregoing examples.

Although the invention is more particularly of value in connection with the manufacture of grinding wheels due to the high temperatures occurring in use thereof, nevertheless any abrasive article is regarded as falling within the scope of the present invention.

What I claim is:

1. An abrasive article comprising abrasive grains bonded with a heat cured phenolic resin which is the aldehyde condensation product of the preformed reaction product of an inorganic esterifying agent selected from the class consisting of boric acid, the phosphoric acids, polyfunctional chlorine derivatives of the phosphoric acids and phosphorus trichloride, with a polyhydroxy aromatic compound having an unsubstituted position in the nucleus reactive with formaldehyde, said reaction product containing at least one esterified phenolic hydroxy group for each molecule of the polyhydroxy aromatic compound and a substantial proportion of unesterified phenolic hydroxy groups.

2. An abrasive article as claimed in claim 1 in which said cured phenolic resin contitutes from 10 to 15% by weight of said abrasive grains.

3. An abrasive article comprising abrasive grains bonded with a heat cured phenolic resin which is the aldehyde condensation product of the preformed reaction product of an inorganic esterifying agent selected from the class consisting of boric acid, the phosphoric acids, polyfunctional chlorine derivatives of the phosphoric acids and phosphorus trichloride with a mixture of mono- and poly-hydroxy aromatic compounds having an unsubstituted position in the nucleus reactive with formaldehyde, said reaction product containing at least one esterified phenolic hydroxy group for each molecule of the polyhydroxy aromatic compound and a substantial proportion of unesterified phenolic hydroxy groups.

4. An abrasive article as claimed in claim 3 in which said cured phenolic resin constitutes from 10 to 15% by weight of said abrasive grains.

5. A process of manufacturing an abrasive article which comprises molding under heat and pressure, a mixture comprising abrasive grains and a phenolic resin comprising a preformed reaction product of an inorganic esterifying agent selected from the class consisting of boric acid, the phosphoric acids, poly-functional chlorine derivatives of the phosphoric acids and phosphorous trichloride, with a polyhydroxy aromatic compound having an unsubstituted position in the nucleus reactive with formaldehyde, an equivalent amount of inorganic esterifying agent having been reacted with the polyhydroxy aromatic compound sufficient to esterify at least one hydroxy group for each molecule of the polyhydroxy aromatic compound, and said reaction product containing a substantial proportion of unesterified phenolic hydroxy groups and a compound decomposable into an aldehyde under the influence of heat.

6. A process as claimed in claim 5 in which said compound decomposable into an aldehyde is decomposable into formaldehyde.

7. A process as claimed in claim 5 in which the abrasive article molded under heat and pressure is finally cured at a temperature of 200° C.

8. A process of manufacturing an abrasive article which comprises molding under pressure a mixture comprising abrasive grains and a phenolic resin comprising a preformed reaction product of an inorganic esterifying agent selected from the class consisting of boric acid, the phosphoric acids, poly-functional chlorine derivatives of the phosphoric acids and phosphorous trichloride, with a polyhydroxy aromatic compound having an unsubstituted position in the nucleus reactive with formaldehyde, an equivalent amount of inorganic esterifying agent having been reacted with the polyhydroxy aromatic compound sufficient to esterify at least one hydroxy group for each molecule of the polyhydroxy aromatic compound, and said reaction product containing a substantial proportion of unesterified phenolic hydroxy groups and a compound decomposable into an aldehyde under the influence of heat, and curing the resin by the application of heat.

References Cited in the file of this patent
UNITED STATES PATENTS

| | | |
|---|---|---|
| 2,321,766 | Murdock | June 15, 1943 |
| 2,606,887 | Pearce | Aug. 12, 1952 |
| 2,606,888 | Williams et al. | Aug. 12, 1952 |
| 2,703,792 | Kropa et al. | Mar. 8, 1955 |